United States Patent Office 3,110,614
Patented Nov. 12, 1963

3,110,614
TREATMENT OF GLASS BEADS WITH METHYL HYDROGEN POLYSILOXANE
Eduard R. de Vries, Flemington, N.J., assignor to Prismo Safety Corporation, Huntingdon, Pa., a corporation of Pennsylvania
No Drawing. Filed Dec. 11, 1962, Ser. No. 243,744
22 Claims. (Cl. 117—100)

The present invention relates to the production of silicone-coated glass beads, and more particularly to methods and the products obtained by treatment of glass beads by particular coating compositions in the manner set forth.

This application is a continuation-in-part of applicant's copending applications Serial No. 833,146, filed August 12, 1959, now abandoned, and Serial No. 685, filed January 6, 1960.

Simplified flow diagrams of the methods are as follows:

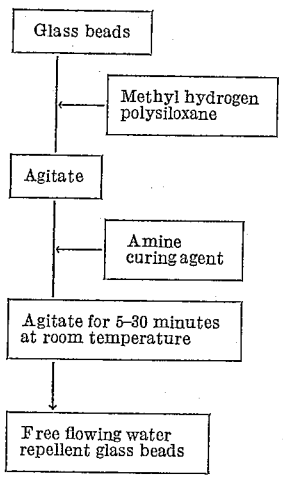

and

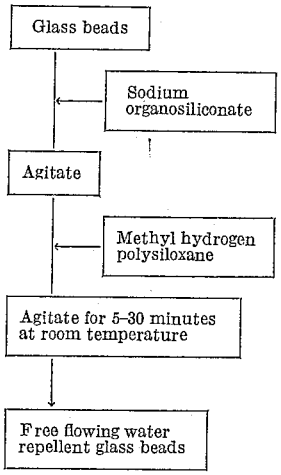

The use of glass beads in reflex reflector markings for highways, highway signs, and the like has increased tremendously due to its required use by many state, county and municipal highway departments. It has been found that markings on highways incorporating glass beads not only increases the night visibility, but also markedly increases the life of the markings. Such markings have been produced by painting the highway with the desired lines and then dropping glass beads from a dispenser onto the paint while still wet. It has also been proposed to produce such markings by application of a paint containing the beads.

Particularly in the drop-on technique, difficulty has been encountered in dispensing the glass beads, due to the tendency of the small glass beads to stick together after exposure to a relatively humid atmosphere. This results in the clogging of dispensing machines used for applying the beads onto the painted lines.

Heretofore, it has been proposed to coat glass beads with certain materials to moisture-proof the beads and thus prevent the tendency to stick together. Silicone coatings have been proposed, but the application of a siloxane coating to glass beads having a diameter of about 1–10 mils and then converting such coating to a silicone is an extremely difficult operation, and the particular coating compositions heretofore proposed have not been entirely successful.

The use of chlorosilanes has been proposed; however, the use of this material results in certain difficulties. First of all, the reaction is carried out at elevated temperatures in vapor phase, and secondly hydrogen chloride is liberated. This corrosive gas makes this process a difficult one to use. Also, results are critical in regard to the amount of chlorosilane used. This easily results in over-moisture-proofing, causing haziness on the surface of the beads.

It is therefore an object of the present invention to provide an improved method for producing glass beads coated with a silicone.

Another object of the present invention is to provide improved glass beads which are water repellent, and which are free flowing even under humid or moist conditions.

A still further object of the present invention is to provide a process for rapidly moisture-proofing glass beads at room temperatures.

A further object of the present invention is to provide a novel coating composition suitable for use in moisture-proofing glass beads.

Other objects and advantages of the present invention will be apparent from the following description of the invention.

In accordance with this invention, it has been found that glass beads can be quickly moisture-proofed at room temperatures by coating the beads with a cured liquid methyl hydrogen polysiloxane. The curing may be effected by an amine curing agent or sodium salts of organosiliconates to accelerate the cure of the methyl hydrogen polysiloxane, or by the use of elevated temperatures, the curing agent can be eliminated.

The methyl hydrogen polysiloxane, which is available commercially, has the formula $$(CH_3)_x H_y SiO_{\frac{4-x-y}{2}}$$

where $x$ has a value from 1.0 to 1.5, $y$ has a value from 0.7 to 1.25 and the sum of $x$ and $y$ is a value from about 2.0 to 2.25 inclusive. The methyl hydrogen polysiloxanes are made from a methyl hydrogen hydrolyzable silane, for instance, one having the general formula $$CH_3SiHX_2$$

where X is a hydrolyzable radical, for instance, chlorine, bromine, alkoxy (e.g. ethoxy), acetate, etc. radicals. The methyl hydrogen polysiloxanes may contain traces of hydroxy radicals due to the incomplete condensation of the silicols obtained as a result of hydrolysis of intermediate methyl hydrogen hydrolyzable silanes.

As an example, the methyl hydrogen polysiloxane may be obtained by cohydrolyzing methyl dichlorosilane with a small amount of trimethyl chlorosilane so as to obtain a polymeric material having the general formula

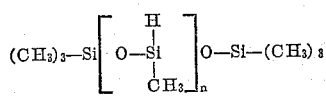

where $n$ is an integer greater than 1, e.g., 2 to 30 or more. A typical polymer of this formula is a fluid having a specific gravity of about 0.98 and having a pH of 7, the value of $n$ averaging about 20 to 30.

As curing agents for the methyl hydrogen polysiloxane, it has been found that excellent results are obtained at room temperatures in a relative short period of time using aliphatic amines or sodium salts of the organosiliconates. The amines may be mono or diamines and may be primary, secondary, or tertiary amines. Examples are primary alkyl amines such as octylamine; secondary alkyl amines, such as diethylamine; tertiary aliphatic amines exemplified by triethylamine and triethanol amine; and aliphatic polyamines such as ethylene diamine, diethylene triamine, and triethylene tetramine. Heterocyclic and aromatic amines have not been found satisfactory.

The sodium salts of the organosiliconates, which are highly alkaline, also act to cure the methyl hydrogen polysiloxane. The presence of water is desirable and hence a water solution of the salts is used. The sodium salts of the organosiliconates which have been found useful have organo portions which are aliphatic and have a ratio of carbon atoms to silicon atoms of 1.75:1. The water solutions contain approximately 30% solids—20% silicone and 10% $Na_2O$. These salts are light amber in color, have a specific gravity of 1.21–1.24 and a pH value of 12 to 13. Examples of suitable materials are Dow Corning 771 and 772 sold by Dow Corning Corporation, Midland, Michigan. These materials are highly alkaline and react with air so they must be stored in sealed containers.

The methyl hydrogen polysiloxane and amine curing agent may each be diluted with a chlorinated solvent such as methylene chloride, chloroethylene, carbon tetrachloride, chloroform or the like. The choice of solvent is not critical since it merely serves as a carrier; however, it should be fast evaporating at room temperature, nonflammable and compatible with the other ingredients. The solvent is not essential, but gives a more rapid distribution of the ingredients on the surface of the beads.

The amount of liquid methyl hydrogen polysiloxane to be incorporated in the composition can vary between 0.01 ml. to 1 ml. per pound of glass beads. The preferred amount is 0.1 ml. per pound of beads. The amount to be used varies with the size of the beads and the surface area. The amount of amine curing agent is from 1–50% based on the weight of the polysiloxane. The preferred amount is about 20%. The amount of the sodium organo-siliconate is from 10–200% based on the weight of the polysiloxane. The solvent is added in sufficient quantity to dilute the ingredients so that an adequate and rapid distribution of the material can be obtained.

In operation, when using the amine curing agent, the methyl hydrogen polysiloxane may be added to the glass beads at room temperature with mechanical agitation. When the glass beads are coated the amine curing agent is added. After a period of approximately 5–30 minutes, the methyl hydrogen polysiloxane has completely cured. The resulting beads are water repellent and free flowing, even in humid atmospheres.

In a typical example, 100 pounds of glass beads having an average diameter of 10 mils were agitated with a composition comprising 10 ml. methyl hydrogen polysiloxane, identified as Dow Corning DC 1107 diluted with methylene chloride. When the beads were wetted by the polysiloxane, 2 gm. of triethylenetetramine diluted with methylene chloride to yield a sprayable consistency was added with continued agitation. The glass beads were found to be moisture-proofed in a period of 10 minutes, and when the coated beads were poured into a glass funnel they were free flowing and passed through the funnel without clogging the inlet thereto.

In commercial use a continuous process of coating can be used wherein the glass beads are continuously conveyed and agitated beneath a spray of the polysiloxane material and then the curing agent. By the time the glass beads reach the end of the conveyor, the curing has been completed and the glass beads are ready for use or storage.

The polysiloxane and the amine curing agent cannot be mixed together before spraying because of the rapid cure effected causing the liquid to solidify before the beads are covered.

When using the sodium organosiliconate as the curing agent, the sodium organosiliconate is first added to the glass beads with agitation. When the beads are coated, the methyl hydrogen polysiloxane is added with continued agitation until the coating has cured after a period of approximately 5–30 minutes.

The alkaline curing agent first coats the beads, thus insuring the surface condition of the glass which is most favorable to the curing of the methyl hydrogen polysiloxane.

In a typical example, 100 pounds of glass beads having an average diameter of 10 mils were agitated with a composition comprising 2 ml. sodium organosiliconate, identified as Dow-Corning DC 771. When the beads were wetted by the sodium organosiliconate, 10 gm. of methyl hydrogen polysiloxane, identified as Dow Corning DC 1107, diluted with methylene chloride to yield a sprayable consistency was added with continued agitation. The glass beads were found to be moisture-proofed in a period of 10 minutes, and when the coated beads were poured into a glass funnel they were free flowing and passed through the fuel without clogging the inlet thereto.

In commercial use, a continuous process of coating can be used wherein the glass beads are continuously conveyed and agitated beneath a spray of the sodium organosiliconate and then the polysiloxane material. By the time the glass beads reach the end of the conveyor, the curing has been completed and the glass beads are ready for use or storage.

The polysiloxane and the sodium organosiliconate cannot be mixed together before spraying because of the rapid cure effected causing the liquid of solidify before the beads are covered.

The coating of the glass beads may also be accomplished in another manner. The methyl hydrogen polysiloxane can be applied to the glass beads either with or without the curing agent, and the mixture mechanically agitated for approximately 5–10 minutes at a temperature of approximately 300° F. The coated beads are then fully cured and ready for use.

It has been found that glass beads coated with other polysiloxanes than the methyl hydrogen polysiloxane at room temperatures or even at slightly elevated temperatures did not give satisfactory results. When the glass beads are coated with such polysiloxanes as vinyltriethoxysilane, dimethyl polysiloxane, and other polysiloxanes carrying the identifications of Dow Corning No. Z–4141, DC 200, XZ–4128, Z–6020, DC 840, XZ–4148 and XZ–4138, either at elevated temperatures or in combination with the same curing agents under the same conditions of time and temperature, unsatisfactory results are obtained. When the coated beads are poured into the funnel, the inlet becomes clogged as the beads are not free flowing. It is believed that these polysiloxanes do not cure completely. Although the beads so coated have been found to be water repellent, they are not free flowing. The coating appears to be mushy or cheesy in consistency, and not like the coating obtained with the methyl hydrogen polysiloxane. This causes the beads to stick together so that they are water-repellent but not free flowing.

It will be obvious to those skilled in the art that various changes may be made without departing from the scope of the invention and therefore the invention is not limited to what is described in the specification but only as indicated in the appended claims.

What is claimed is:

1. A method of treating small glass beads to render them free flowing even under humid conditions which comprises agitating said beads with liquid methyl hydrogen polysiloxane until said methyl hydrogen polysiloxane has cured as a coating on said beads.

2. A method of treating small glass beads to render them free flowing even under humid conditions which comprises agitating said beads with liquid methyl hydrogen polysiloxane and an aliphatic amine curing agent at room temperature until said methyl hydrogen polysiloxane has cured as a coating on said beads.

3. A method as described in claim 2 wherein the amount of polysiloxane is from 0.01–1.0 ml. per lb. of glass beads and the amount of curing agent is from 1–50% based on the weight of the polysiloxane.

4. A method as described in claim 2, wherein the aliphatic amine curing agent is selected from the group consisting of primary alkyl amines, secondary alkyl amines, tertiary alkyl amines, ethylene diamine, diethylene triamine and triethylene tetramine.

5. A method of treating small glass beads to render them free flowing even under humid conditions which comprises agitating small glass beads with a water solution of a sodium salt of an organosiliconate in combination with methyl hydrogen polysiloxane and continuing agitation until said polysiloxane has cured at room temperature as a coating on said beads, said organosiliconate having an aliphatic organo portion and a ratio of 1.75 carbon atoms per silicon atom.

6. A method in accordance with claim 5, wherein the amount of organosiliconate is from 10–200% based on the weight of the polysiloxane.

7. A method in accordance with claim 5, wherein the amount of polysiloxane is from 0.01 to 1.0 ml. per pound of glass beads and the amount of organosiliconate is from 10–200% based on the weight of the polysiloxane.

8. A method of treating small glass beads to render them free flowing even under humid conditions which comprises agitating said bead with liquid methyl hydrogen polysiloxane diluted with a chlorinated solvent which is compatible therewith and is fast evaporating at room temperature, adding an aliphatic amine curing agent when the beads have been completely coated, said amine being diluted with said chlorinated solvent, and continuing agitation until said methyl hydrogen polysiloxane has cured at room temperature on said beads.

9. A method of treating small glass beads to render them free flowing even under humid conditions which comprises agitating said beads with liquid methyl hydrogen polysiloxane and an aliphatic amine curing agent until said methyl hydrogen polysiloxane has completely cured as a coating on said beads.

10. A method as described in claim 9, wherein the amount of polysiloxane is from 0.01–1.0 ml. per pound of glass beads and the amount of curing agent is from 1–50% of curing agent based on the weight of the polysiloxane.

11. A method as described in claim 9, wherein the aliphatic amine curing agent is selected from the group consisting of primary alkyl amines, secondary alkyl amines, tertiary alkyl amines, ethylene diamine, diethylene triamine and triethylene tetramine.

12. A method of treating small glass beads to render them free flowing even under humid conditions which comprises agitating said beads with 0.1 ml. of liquid methyl hydrogen polysiloxane per pound of beads, then adding 0.02 gm. of an aliphatic amine per pound of beads, said amine being selected from the group consisting of primary alkyl amines, secondary alkyl amines, tertiary alkyl amines, ethylene diamine, diethylene triamine, and triethylene tetramine, and continuing agitating until said methyl hydrogen polysiloxane has completely cured as a coating on said beads.

13. A method of treating small glass beads to render them free flowing even under humid conditions which comprises agitating said beads with from 0.01–1.0 ml. liquid methyl hydrogen polysiloxane per pound of glass beads at a temperature of approximately 300° F. until said methyl hydrogen polysiloxane has completely cured as a coating on said beads.

14. A method of treating small glass beads to render them free flowing even under humid conditions which comprises agitating small glass beads with a water solution of a sodium salt of an organosiliconate until they are completely coated, then adding to said coated beads liquid methyl hydrogen polysiloxane, and continuing agitation until said methyl hydrogen polysiloxane has cured at room temperature as a coating on said beads, said organosiliconate having an aliphatic organo portion and a ratio of 1.75 carbon atoms per silicon atom.

15. A method in accordance with claim 14, wherein the amount of polysiloxane is from 0.01 to 1.0 ml. per pound of glass beads and the amount of organosiliconate is from 10–200% based on the weight of the polysiloxane.

16. A method in accordance with claim 14, wherein the polysiloxane is diluted with a chlorinated solvent which is compatible with said organosiliconate and said polysiloxane.

17. A method of treating small glass beads to render them free flowing even under humid conditions which comprises agitating small glass beads with .02 ml. of a sodium salt of an organosiliconate per pound of beads until they are completely coated, said organosiliconate having an aliphatic organo portion and a ratio of 1.75 carbon atoms per silicon atom, then adding to said coated beads .1 ml. of liquid methyl hydrogen polysiloxane per pound of beads, and continuing agitating until said methyl hydrogen polysiloxane has completely cured as a coating on said beads.

18. Small glass beads having an average diameter of approximately 10–30 mils which are free flowing even under humid conditions comprising glass beads coated with a completely cured coating of methyl hydrogen polysiloxane.

19. Small glass beads having an average diameter of approximately 10–30 mils which are free flowing even under humid conditions comprising glass beads coated with an aliphatic amine cured coating of methyl hydrogen polysiloxane.

20. Small glass beads having an average diameter of approximately 10–30 mils which are free flowing even under humid conditions comprising glass beads coated with a sodium salt of an organosiliconate cured coating of methyl hydrogen polysiloxane, said organosiliconate having an aliphatic organo portion and a ratio of 1.75 carbon atoms per silicon atom.

21. Small glass beads in accordance with claim 20, wherein the coating comprises 0.01 to 1.0 ml. methyl hydrogen polysiloxane per pound of beads and 10–200% of said organosiliconate based on the weight of said polysiloxane.

22. Small glass beads having an average diameter of approximately 10–30 mils which are free flowing even under humid conditions comprising glass beads coated with a heat cured coating of methyl hydrogen polysiloxane.

References Cited in the file of this patent

UNITED STATES PATENTS

| | | |
|---|---|---|
| 2,371,068 | Rochow | Mar. 6, 1945 |
| 2,507,200 | Elliott et al. | May 9, 1950 |
| 2,588,366 | Dennett | Mar. 11, 1952 |
| 2,588,367 | Dennett | Mar. 11, 1952 |
| 2,588,393 | Kaupi | Mar. 11, 1952 |
| 2,658,908 | Nitzsche et al. | Nov. 10, 1953 |
| 2,730,841 | Searight | Jan. 17, 1956 |
| 2,739,952 | Linville | Mar. 27, 1956 |
| 2,891,923 | Phreaner | June 23, 1959 |
| 2,938,010 | Bluestein | May 24, 1960 |
| 2,950,985 | Duval 'Adrian | Aug. 30, 1960 |

FOREIGN PATENTS

| | | |
|---|---|---|
| 575,664 | Canada | May 12, 1959 |